3,531,365
HEAT-SEALABLE FABRIC SUPPORTED VINYL FILM
Harold R. Melin, Bloomfield Hills, Mich., assignor to Union Carbide Corporation, a corporation of New York
No Drawing. Filed Oct. 14, 1966, Ser. No. 586,640
Int. Cl. D03d *11/00;* D06m *17/00*
U.S. Cl. 161—89                    2 Claims

ABSTRACT OF THE DISCLOSURE

A fabric backed polyvinyl chloride sheet which is heat sealed while simultaneously effecting a tear-seal, the fabric comprising one of a non-woven scrim, woven fabric or scrim or a knitted fabric made up of synthetic yarns, the fibers of which are derived from polymers capable of accepting a heat seal.

---

This application is a continuation-in-part of my U.S. application Ser. No. 512,777, filed Dec. 9, 1965, and now abandoned.

This invention relates to a novel vinyl product and method of heat sealing vinyl film supported by fabric whereby to effect a tear-seal.

Vinyl chloride film supported by fabrics is notoriously well known in the art. In the usual case, the art has sought in commercial practice to employ the cheapest fabric which will give the greatest tear and tensile strength properties to the film. Moreover, fabric backing of vinyl chloride adds plumpness to the vinyl film thus enhancing its attractiveness and broadening its saleability. In the usual case, the art has chosen to employ cotton fabrics mainly because of their low cost and because they are readily available in knit and woven form. Unfortunately, such fibers are incapable of being utilized for supporting vinyl chloride in areas where heat sealing is necessary to effect a tear-seal. As a result, in order for the art to separate a fabric backed film after it is heat sealed, the art either had to use clicking or other type of cutting operations to isolate the desired product. This has greatly increased the cost of operation adding greater manpower requirements and additional steps in the process.

There is described herein a fabric backed polyvinyl-chloride sheet which can be heat sealed, preferably dielectrically heat sealed, while simultaneously effecting a tear-seal. The fabric of this invention comprises one of a non-woven scrim, woven fabric or scrim or a knitted fabric to which is laminated a film or vinyl chloride resin. The fabric is made up of yarns comprising fibers which are derived from polymers capable of accepting a heat-seal. Such fibers are desirably obtained from the polymerization of vinyl chloride, such as vinyl chloride homopolymers and vinyl chloride copolymers. Particularly desirable vinyl chloride copolymers include, e.g., modacrylics such as copolymers of 60 weight percent vinyl chloride and 40 weight percent acrylonitrile sold under the trademark of Dynel (a product of Union Carbide Corporation, New York, N.Y.), copolymers of vinyl chloride and vinyl acetate sold under the trademark of Vinyon (a product of FMC Corporation), copolymers of vinyl chloride and vinylidene chloride sold under the name of Saran (a product of Dow Chemical Company, Midland, Mich.). Such fibers are readily heat sealable, particularly dielectrically heat sealable, with the vinyl film to achieve a tear-seal.

The terms "vinyl film," "vinyl chloride film," "polyvinylchloride" and "vinyl chloride resin," as employed herein, mean plasticized polyvinylchloride and copolymers of vinyl chloride with other vinyl monomers (such as vinyl acetate, vinyl alcohol, alkyl acrylates, vinylidene chloride and the like) or polyvinylchloride and the above vinyl chloride copolymers in plastisol or organosol form, and the like.

The process of heat sealing the above fabric backed vinyl film may be any of those known techniques employed commercially. The exact heat sealing mechanism employed is not critical to this invention though dielectric heat-sealing is much preferred. Heat sealing is achieved by lowering a cutting die capable of transmitting radio frequency currents. As a result, energy is transmitted from the die when it is lowered in contact with the film causing the film to melt only in the vicinity of the die. In addition, conventionally heated heat-sealing dies may be employed with advantageous results. In addition the fabric is also melted to achieve a complete melting through the laminate of fabric and vinyl. This effects total cutting separation of the film at the point where the die contacts the film. Thus, during the dielectric heat sealing operation, the waste film can be readily separated from the desired heat-sealed film by simply pulling it by hand. The advantages of this procedure are obvious when compared with the conventional methods which comprise heat sealing and clicking or cutting with common scissors to define the outline of the heat seal of the desired fabric-film product.

The techniques employed in effecting heat-sealing in the practice of the present invention are not unusual. For example, a most adequate illustration of the present invention involves laminating a film of plasticized polyvinylchloride to a knit fabric of a modacrylic fiber comprising 40 weight percent acrylonitrile and 60 weight percent vinyl chloride, and subjecting this laminate to a dielectric heat-sealing operation. The heat-sealing die is impressed into the film without the necessity of actually depressing the thickness of the film and the energy, in the form of radio frequency waves, is generated through the film from the die whereby to achieve melting of the film at the points of die contact. During this operation the die proceeds through the film and the fabric whereby to melt both causing them to separate from the waste edge. To achieve a satisfactory tear-seal, as described above, it is preferred that the die have a chiselled edge which effects concentration of energy at a localized point whereby to effect rapid film-fabric separation at the point where the die touches the film.

Though this invention has been described with respect to specific details thereof, such details are not intended for the purpose of limiting this inventor.

What is claimed is:

1. A tear-sealed fabric and vinyl film laminate comprising a layer of vinyl chloride resin bonded to a fabric layer which fabric layer is from the group consisting of non-woven scrims, woven scrims, woven fabrics and knitted fabrics of a fiber made from a polymer of vinyl chloride, said laminate having been heated sufficiently along the outline of the heated area to achieve a tear-seal.

2. A product of claim 1 wherein the polymer is a copolymer of vinyl chloride and acrylonitrile.

References Cited

UNITED STATES PATENTS

| | | | |
|---|---|---|---|
| 2,281,635 | 5/1942 | Strauss | 161—89 |
| 2,638,963 | 5/1953 | Frederick et al. | 156—273 |
| 2,722,495 | 11/1955 | Hedges | 156—231 |
| 3,053,806 | 9/1962 | La Combe et al. | 260—49 |
| 3,072,512 | 1/1963 | Dalle | 161—89 |
| 3,141,804 | 7/1964 | Kauffeld | 156—257 |
| 3,345,226 | 10/1967 | Frenkel et al. | 156—273 |

ROBERT F. BURNETT, Primary Examiner

R. L. MAY, Assistant Examiner

U.S. Cl. X.R.

156—273; 161—92, 252